United States Patent [19]

Viklund et al.

[11] Patent Number: 5,902,961

[45] Date of Patent: May 11, 1999

[54] CABLE MANAGER

[75] Inventors: Mark Viklund, New Milford; Jeff Edgerly, Bristol, both of Conn.

[73] Assignee: The Siemon Company, Watertown, Conn.

[21] Appl. No.: 08/789,040

[22] Filed: Jan. 28, 1997

[51] Int. Cl.[6] .................................................. H02G 3/00
[52] U.S. Cl. ........................ 174/100; 248/68.1; 439/470
[58] Field of Search ................................ 174/100, 68.1, 174/68.2, 68.3, 71 R, 72 R, 72 A, 97, 70 C, 95, 99 R, 65 R; 248/49, 53, 65, 68.1, 58; 138/112, 113; D8/356; D13/155; 439/470, 471, 472

[56] References Cited

U.S. PATENT DOCUMENTS

| 1,590,569 | 6/1926 | Fisk | 439/17 |
|---|---|---|---|
| 3,494,657 | 2/1970 | Tantlinger et al. | 296/208 |
| 3,727,644 | 4/1973 | Kagan | 138/155 |
| 3,733,755 | 5/1973 | Butler | 52/36.6 |
| 4,406,379 | 9/1983 | Anderson et al. | 220/335 |
| 4,629,826 | 12/1986 | Thomas | 174/99 R |
| 4,990,722 | 2/1991 | Navazo | 174/97 |

Primary Examiner—Dean A. Reichard
Assistant Examiner—Dhiru R Patel
Attorney, Agent, or Firm—Cantor Colburn LLP

[57] ABSTRACT

A cable manager including a channel and a plurality of channel retainers mounted to the channel. Slots are provided on the channel for mounting the channel retainers thereby allowing the user to dictate the position of the channel retainers. The channel retainers may be completely removed from the channel or may be pivoted to the left or the right to provide access to the cables within the channel. Cable management devices may be mounted within the channel to separate different types of cable.

12 Claims, 12 Drawing Sheets

CABLE MANAGER

FIELD OF THE INVENTION

The invention relates generally to cable managers for containing cable and in particular to a cable manager that provides flexibility in positioning channel retainers and facilitates access to the cables positioned in the cable manager.

PRIOR ART

Vertical cable managers are used in applications where cable (copper, optical fiber, co-axial cable, etc.) is positioned adjacent to a rack system. FIG. 1 is a perspective view of a conventional vertical cable manager shown generally at 1. The vertical cable manager is made up of a channel 2 having a plurality of channel retaining arms 3 mounted to stand-off legs 4. The cable retaining arms 3 are pivotally connected to the stand-off legs 4 by pin 5. Cables are placed within the channel 2 by rotating the cable retaining arm 3 about pin 5 to provide access to the channel 2. Protective edge guards 6 are placed on the periphery of the channel 2 in order to protect the cables from sharp edges or burrs on the edge of the channel 2.

The conventional vertical cable manager 1 has several disadvantages. First, the location of the stand-off legs 4, and thus the cable retaining arms 3, are fixed because the stand-off legs 4 are integral with the channel body 2. Therefore, the stand-off legs 4 may interfere with apparatus mounted in an adjacent rack. If this occurs, the user must route cable around the stand-off leg 4. This is an inconvenience and provides a less orderly cable installation. In addition, the stand-off legs 4 reduce the opening to the channel due to right angled sections formed on the end of each stand-off leg 4.

Another deficiency in the prior art vertical cable manager 1 is that the cable retaining arms 3 are hinged at a single, fixed position. Often rack systems are mounted in areas where space is limited and thus it is not always convenient to rotate the cable retaining arm 3 in the same direction depending upon the placement of adjacent equipment. Lastly, the use of protective edge guards 6 requires the manufacturer to produce additional parts and inventory the additional parts.

SUMMARY OF THE INVENTION

The above-discussed and other drawbacks and deficiencies of the prior art are overcome or alleviated by the cable manager of the present invention. The cable manager includes a channel and a plurality of channel retainers removably mounted to the channel. Slots are provided on the channel for mounting the channel retainers thereby allowing the user to dictate the position of the channel retainers. The channel retainers may be completely removed from the channel or may be pivoted to the left or the right to provide access to the cables within the channel. The channel includes openings for mounting cable management devices within the channel to separate different types of cable.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGS..

DETAILED DESCRIPTION OF THE INVENTION

Figure 2:
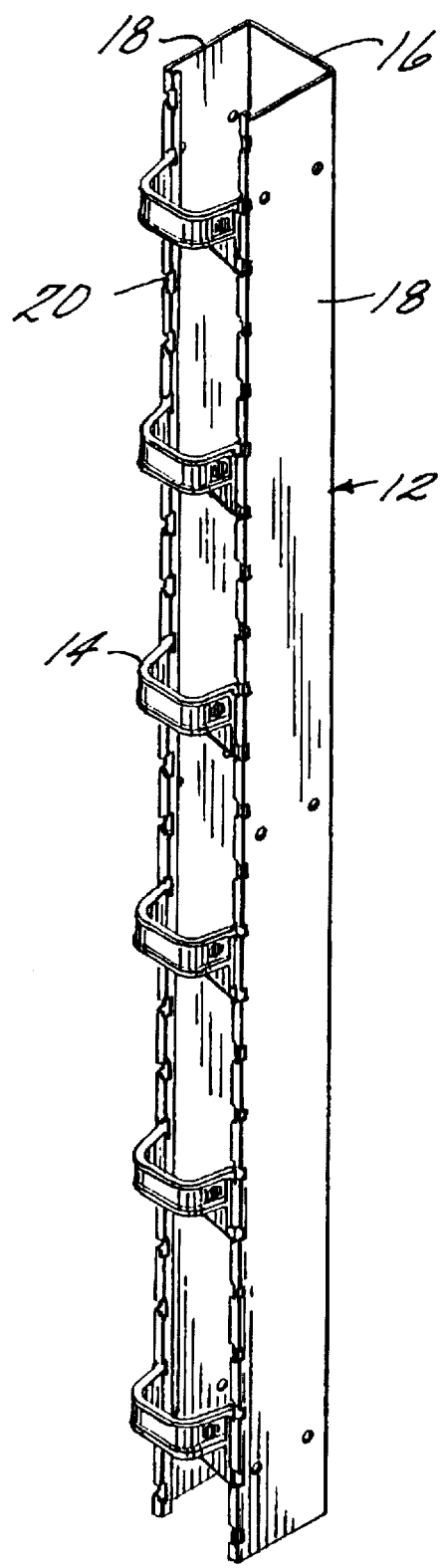
FIG. 2 is a perspective view of the cable manager of the present invention.

FIG. 2 is a perspective view of the cable manager of the present invention shown generally at 10. The cable manager 10 is made up of a channel 12 and one or more channel retainers 14 mounted to the channel 12. As described in detail below, the channel retainers 14 may be completely detached from the channel 12 or have one end detached from the channel 12 and the other end pivotally attached to the channel 12.

Figure 1:
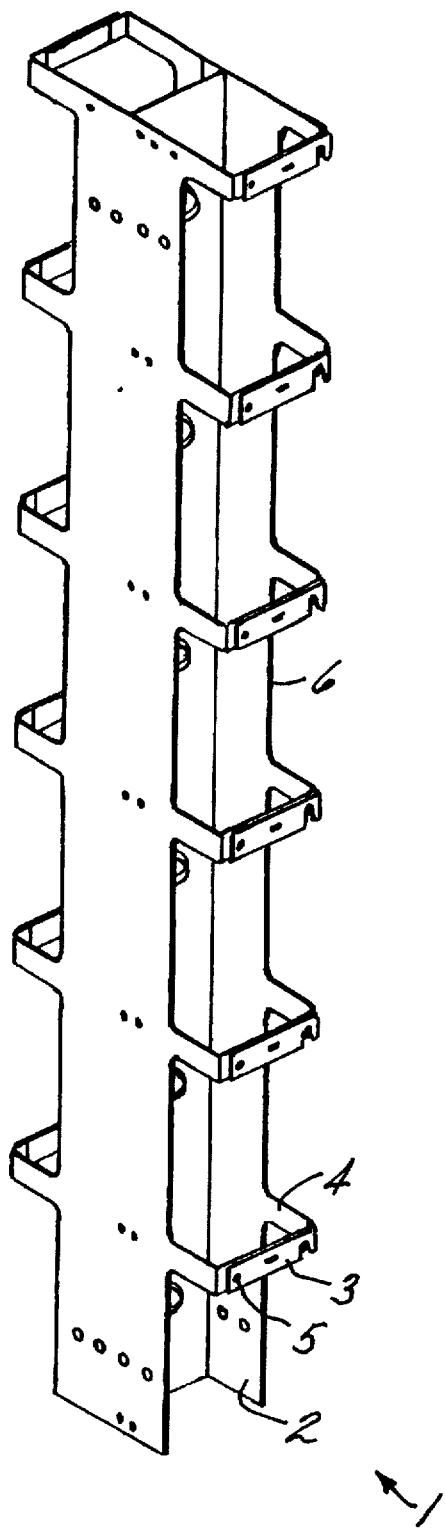
FIG. 1 is a perspective view of a conventional vertical cable manager.

The channel 12 shown in FIG. 2 has a back wall 16 and two sides walls 18 forming a U-shaped channel. The lengthwise edge of each side wall 18 that is not connected to the back wall 16 includes a plurality of slots 20a and 20b. As described in more detail below, the slots 20a and 20b are shaped to receive a hinge members 22a and 22b (shown in FIG. 3) formed on the channel retainer 14 and allows the channel retainer 14 to be releasably mounted to the channel 12. The interaction between the slots 20a and 20b and the hinge members 22a and 22b formed on the channel retainer 14 allows the channel retainer 14 to be pivotally mounted to the channel 12. The slots 20a and 22b allow the channel retainers 14 to be positioned at 2 rack mount space (RMS) increments. This ability to install the channel retainers in different locations is important because it allows the installer the option of assembling the channel retainer in positions to avoid interfering with cables and products that are mounted to a rack. The user can position the channel retainers 14 at any position to provide pathways for routing cable resulting in a more orderly installation than with the conventional vertical cable manager 1 shown in FIG 1.

Figure 3:
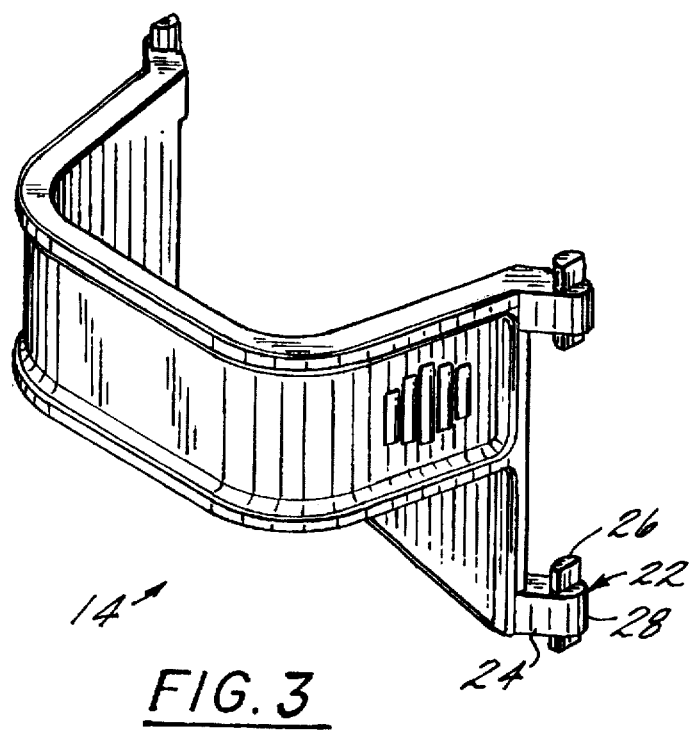
FIG. 3 is a front perspective view of a channel retainer.
Figure 4:
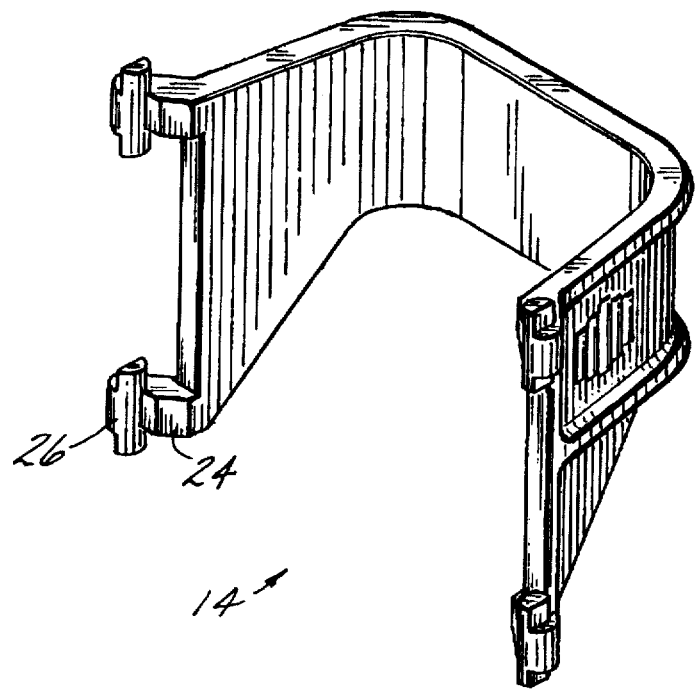
FIG. 4 is a rear perspective view of the channel retainer.
Figure 5:
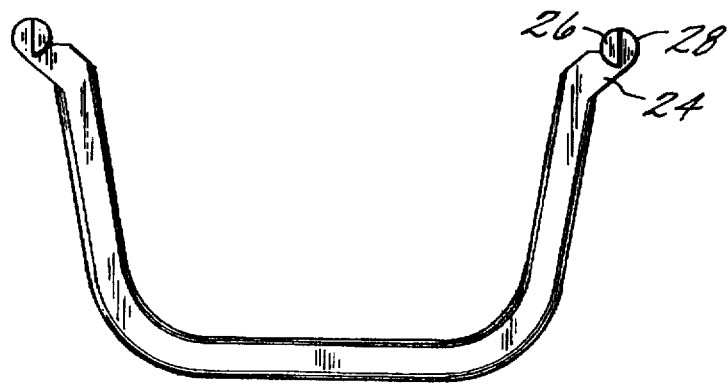
FIG. 5 is a top view of the channel retainer.
Figure 6:
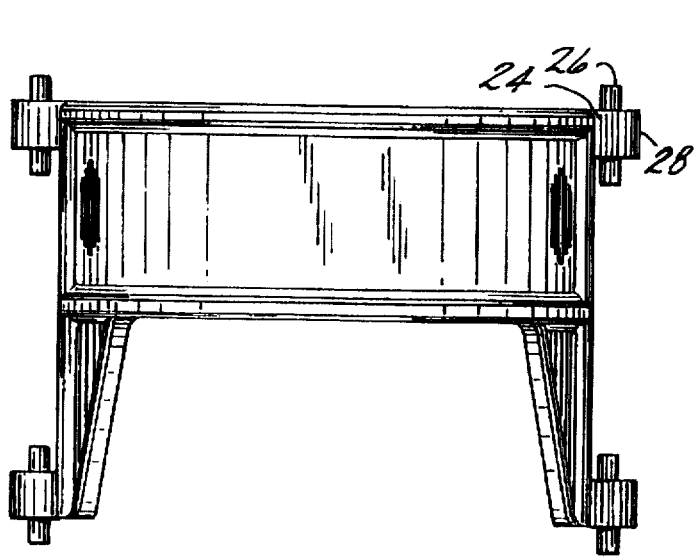
FIG. 6 is a front view of the channel retainer.
Figure 7:
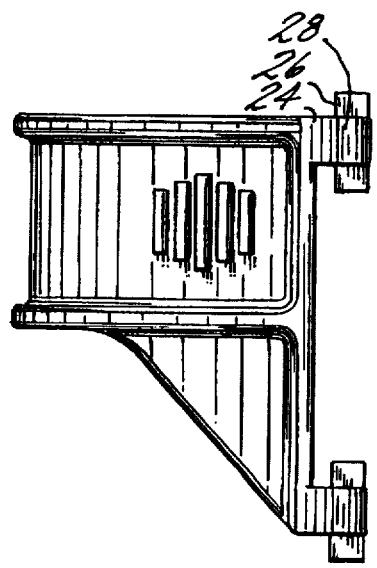
FIG. 7 is a side view of the channel retainer.

FIG. 3 is a perspective view of the channel retainer 14. The channel retainer 14 is generally u-shaped and when mounted to the u-shaped channel 12, forms an enclosed cable management area. The channel retainer 14 includes hinge members 22a and 22b positioned at each end of the channel retainer 14. The hinge members 22a and 22b are made up of an extension 24 and a post 26. One end of the extension 24 is coupled to a side wall of the channel retainer 14 and the other end of the extensions 24 has an arcuate surface 28. As described below, the arcuate surface 28 facilitates rotation of the hinge members 22a and 22b within the slots 20a and 20b. The post 26 shown in FIG. 3 is a half cylinder and is substantially perpendicular to the extension 24. Although two hinge members 22a and 22b are shown on each end of the channel retainer 14, it is understood that one hinge member at each end of the channel retainer 14 may suffice. FIGS. 4–7 are assorted views of the channel retainer 14 and are self explanatory.

Figure 8:
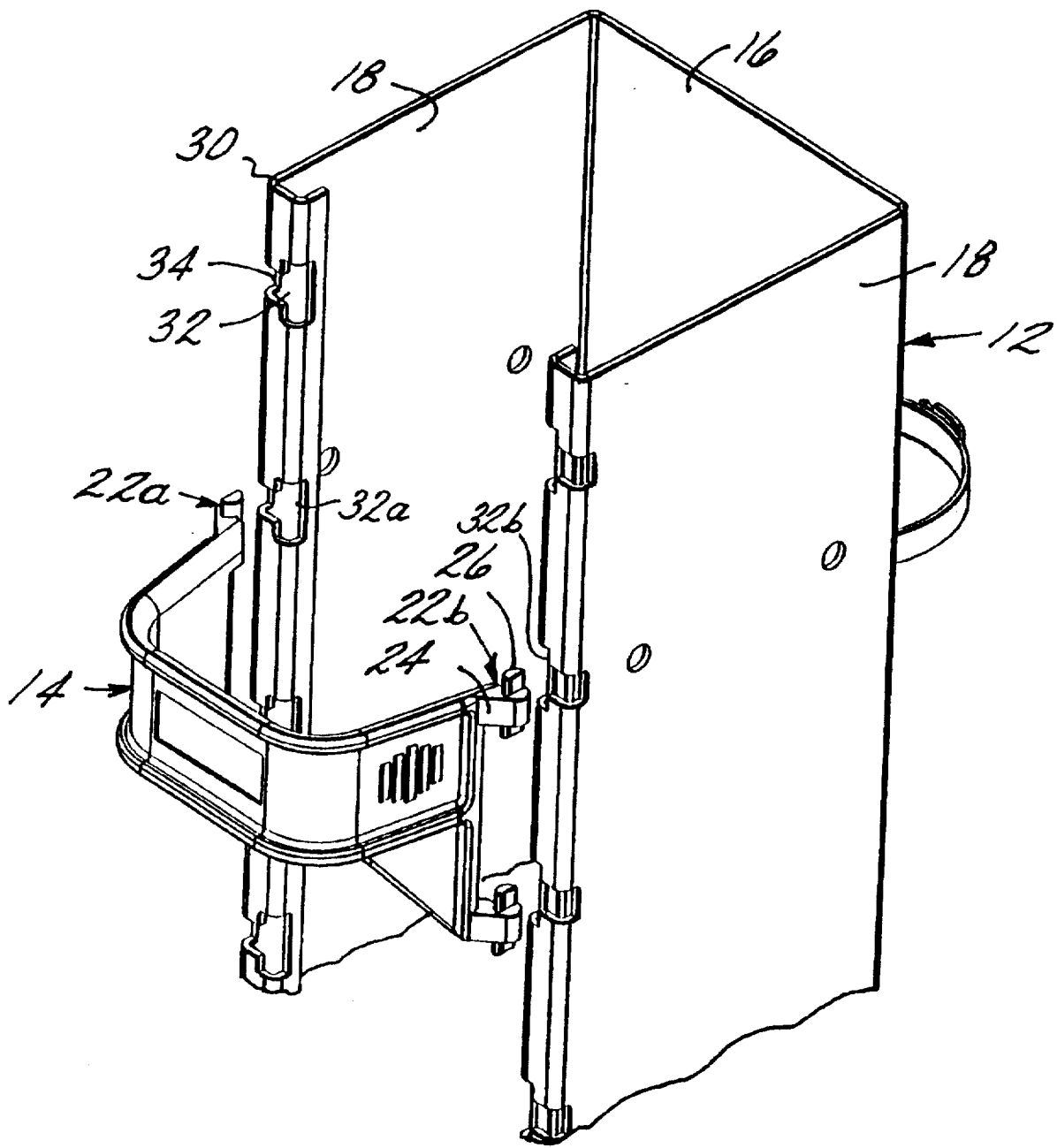
FIG. 8 is an exploded perspective view of a portion of the cable manager.

FIG. 8 is an exploded, perspective view illustrating the channel retainer 14 and the channel 12. As described above, each side wall 18 is joined at one lengthwise edge to the back wall 16. The other lengthwise edge of the side wall 18 is bent to form a bent portion 30. The bent portion 30 shown in FIG. 8 generally u-shaped. It is understood that other bend configurations may be used. The bent portion 30 prevents cables from contacting sharp edges. As described above, conventional vertical cable managers use a grommet along the edge of the channel. By forming bent portion 30, the need for a grommet is eliminated thereby reducing the number of parts making up the cable manager.

Slots 20a and 20b are formed in the bent sections 30 of edge side wall 18. Each slot 20a and 20b and is made up of a slot openings 32a and 32b and a slot neck 34 which is generally perpendicular to the slot openings 32a and 32b. The slot opening 32 has a longitudinal axis that is parallel to the longitudinal axis of the channel 12. The first hinge member 22a and the second hinge member 22b on each end of the channel retainer 14 are spaced apart from each other such that the distance between two hinge members 22a and 22b is greater than the distance between two slot openings 32a and 32b. To mount the channel retainer 14 to the channel 12, the channel retainer 14 is squeezed so that opposed hinge members 22a and 22b are moved towards each other. The posts 26 are then aligned with first slot opening 32a and second slot opening 32b and tension on the channel retainer 14 is released. The channel retainer 14 is made from a resilient material (e.g plastic) and returns to its original state. This forces the posts 26 through the slot openings 32a and 32b and positions the posts 26 in the recess formed by bent portion 30. A portion of the extension 24 is placed in the slot neck 34.

Figure 9:
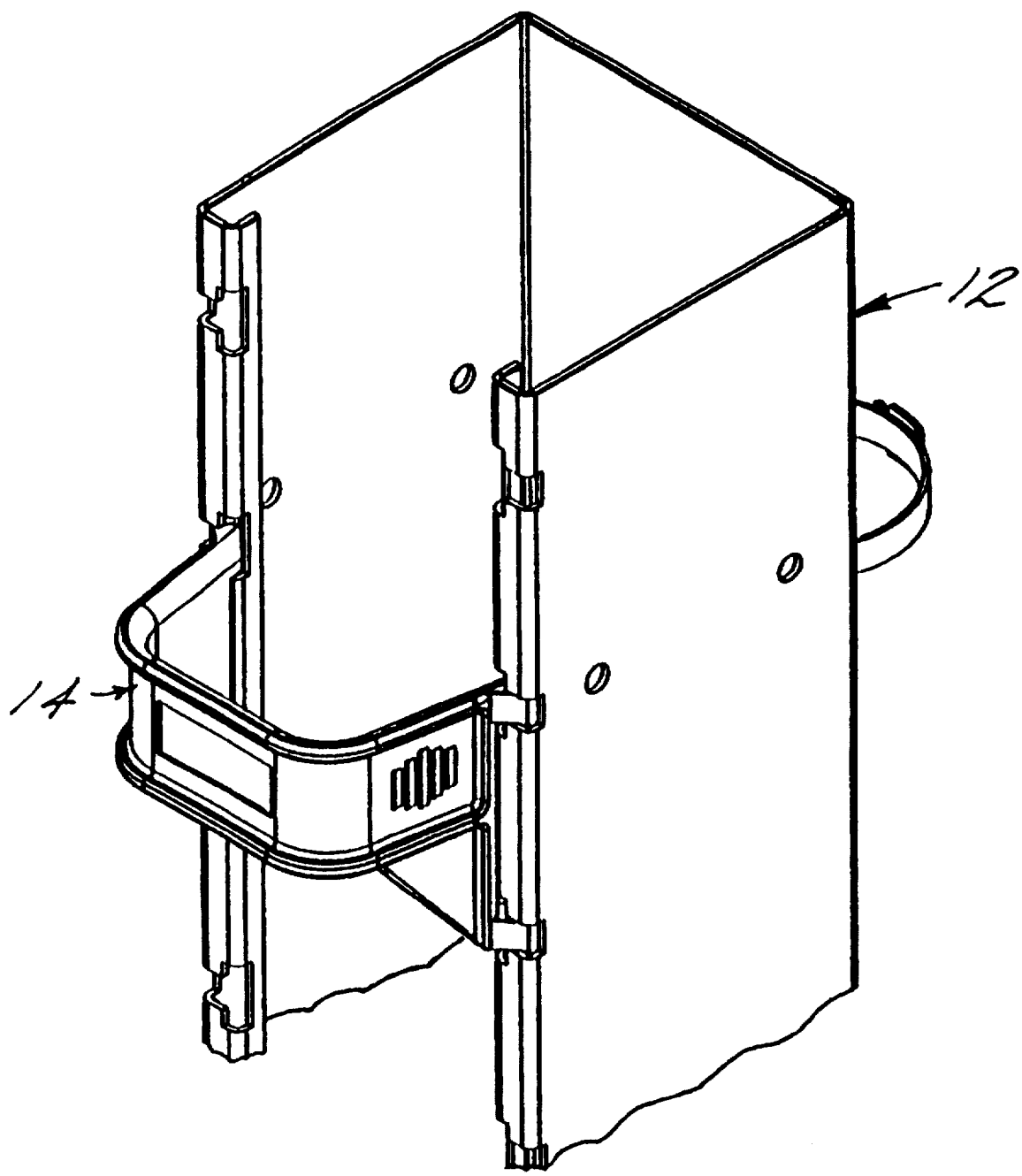
FIG. 9 is a perspective view of a portion of the cable manager showing the channel retainer in the closed position.

FIG. 9 is a perspective view showing the channel retainer 14 mounted to the channel 12. The distance between opposite hinge members 22a and 22b is less than the distance between the interior surfaces of the opposing side walls 18. When tension is removed from the channel retainer 14, it returns to its rest state and is positioned securely in the slots 20a and 20b. The width of bent portion 30 is established so that a significant deflection (e.g. 0.5 inches) of the hinge members 22a and 22b is needed for the posts 26 to clear the slot openings 32a and 32b.

Figure 10:
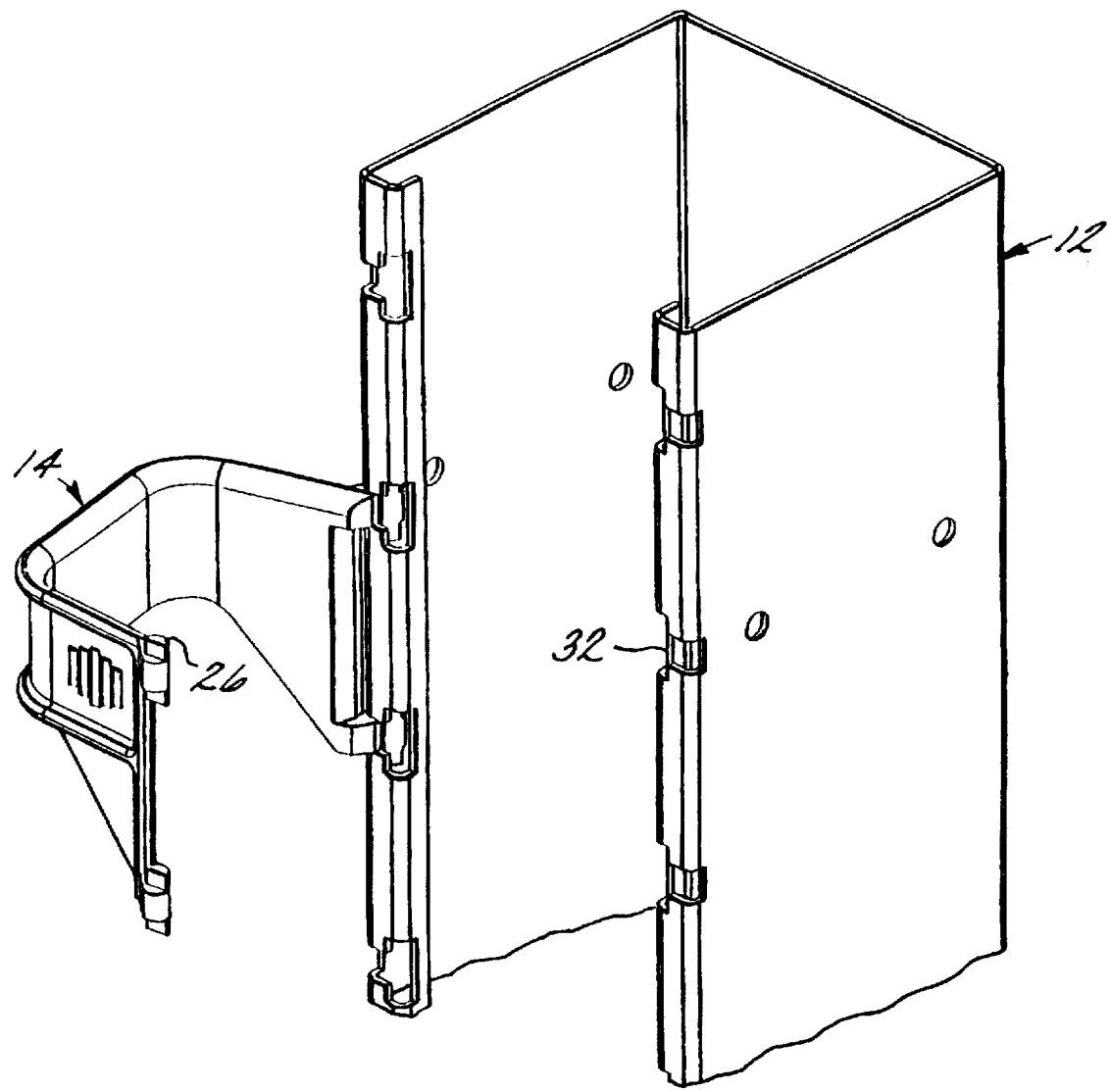
FIG. 10 is a perspective view of a portion of the cable manager showing the channel retainer in the open position.

FIG. 10 is a perspective view of the channel retainer 14 having one end mounted to the channel 12. To release one side of the channel retainer 14, pressure is applied to one end of the channel retainer 14 until the posts 26 clear the slot openings 32a and 32b. At this time, the channel retainer 14 can be pivoted on the hinge members 22a and 22b that remain engaged with slots 20a and 20b. The arcuate surface 28 prevents the extension 24 from interfering with the channel and facilitates rotation of the channel retainer 14. To reinstall the channel retainer 14, pressure is applied to the free end of the channel retainer 14 until the free post 26 can enter slot openings 32a and 32b. The post 26 is placed in the slot openings 32a and 32b and the pressure is released. In accordance with an important aspect of the invention, the channel retainer 14 can pivot on either the first end of the channel retainer or the second end of the channel retainer. This allows the channel retainer 14 to be opened towards the left or the right. The is useful in situations where space is limited and the user may not have the ability to open the channel retainer 14 is both directions. The U-shape of the channel retainer aids in managing cables even when the cables are removed form the channel 12. The channel retainers 14 can be pivoted to the left or right and provide a cable management area for cables as they are removed from the channel 12.

Figure 11:
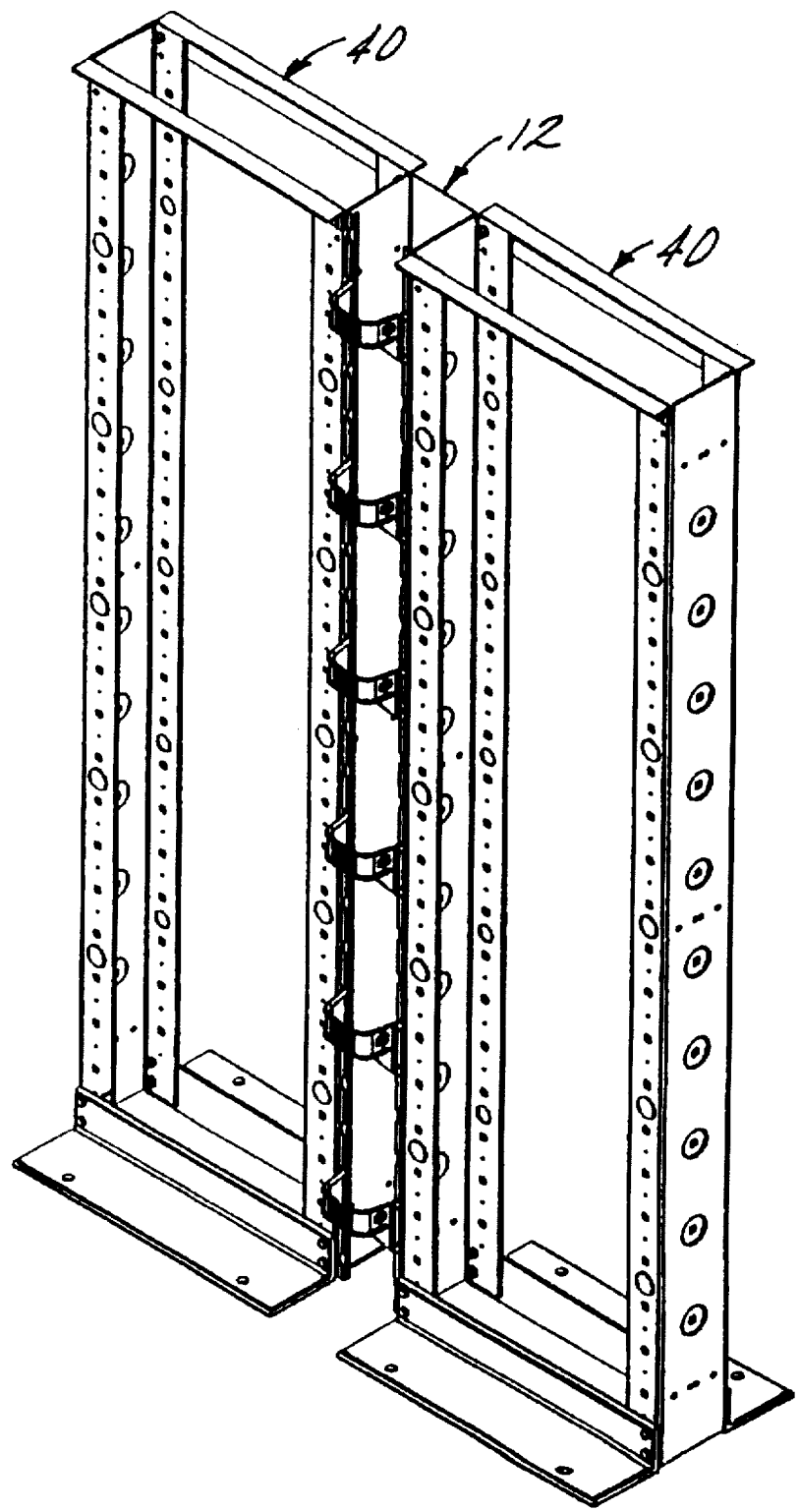
FIG. 11 is a front perspective view of the cable manager positioned between two racks.
Figure 12:
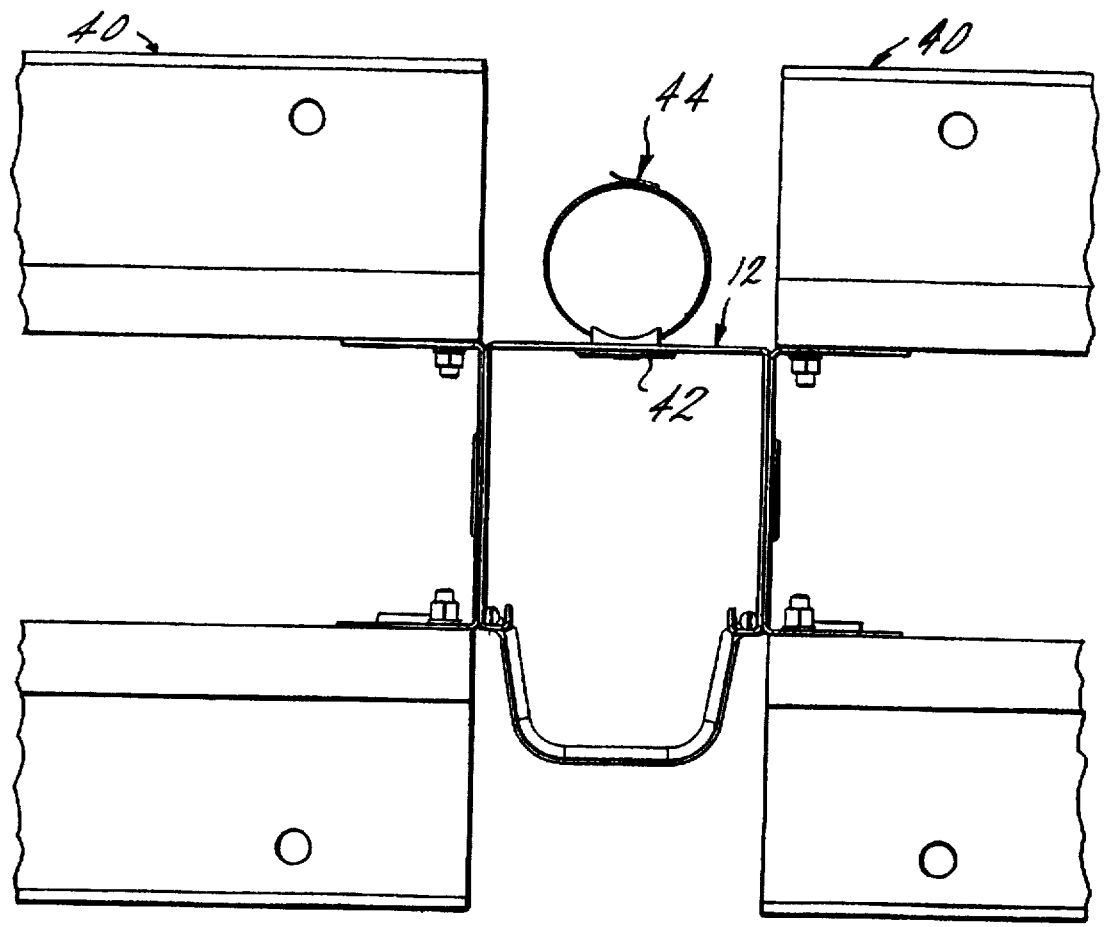
FIG. 12 is a top view of the cable manager positioned between two racks.
Figure 13:
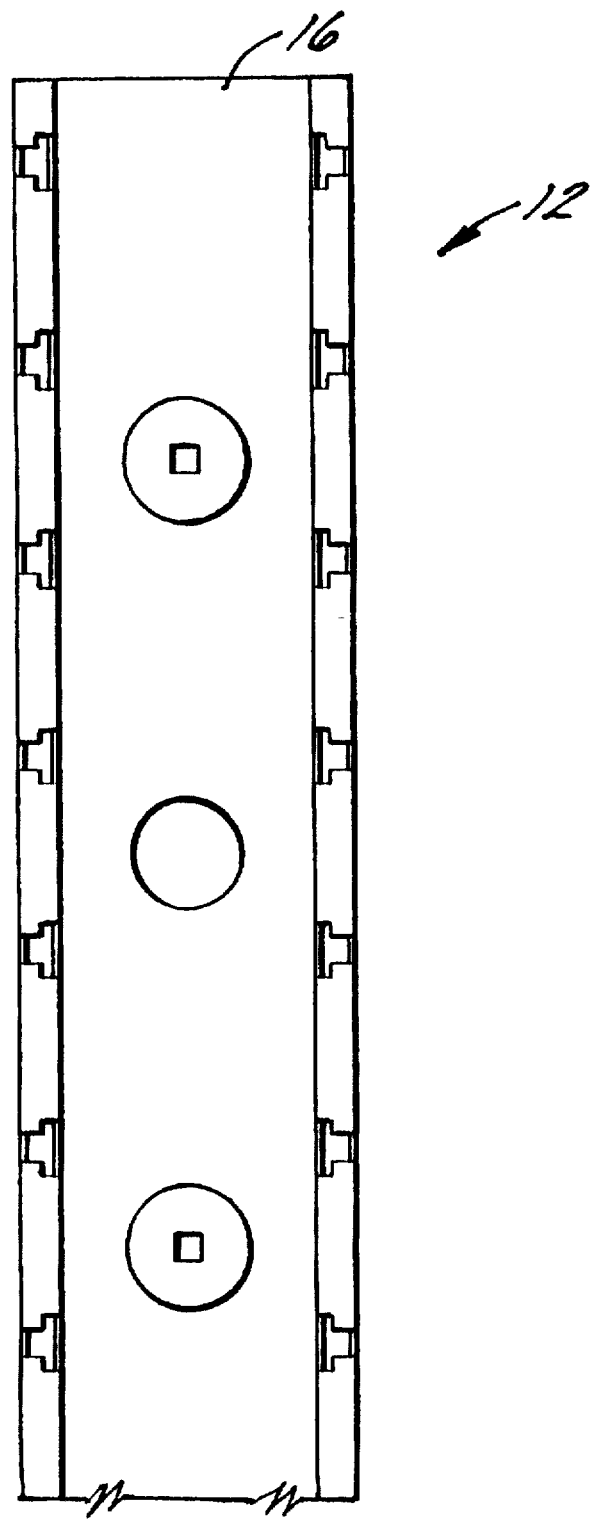
FIG. 13 is a front view of a portion of the channel.
Figure 14:
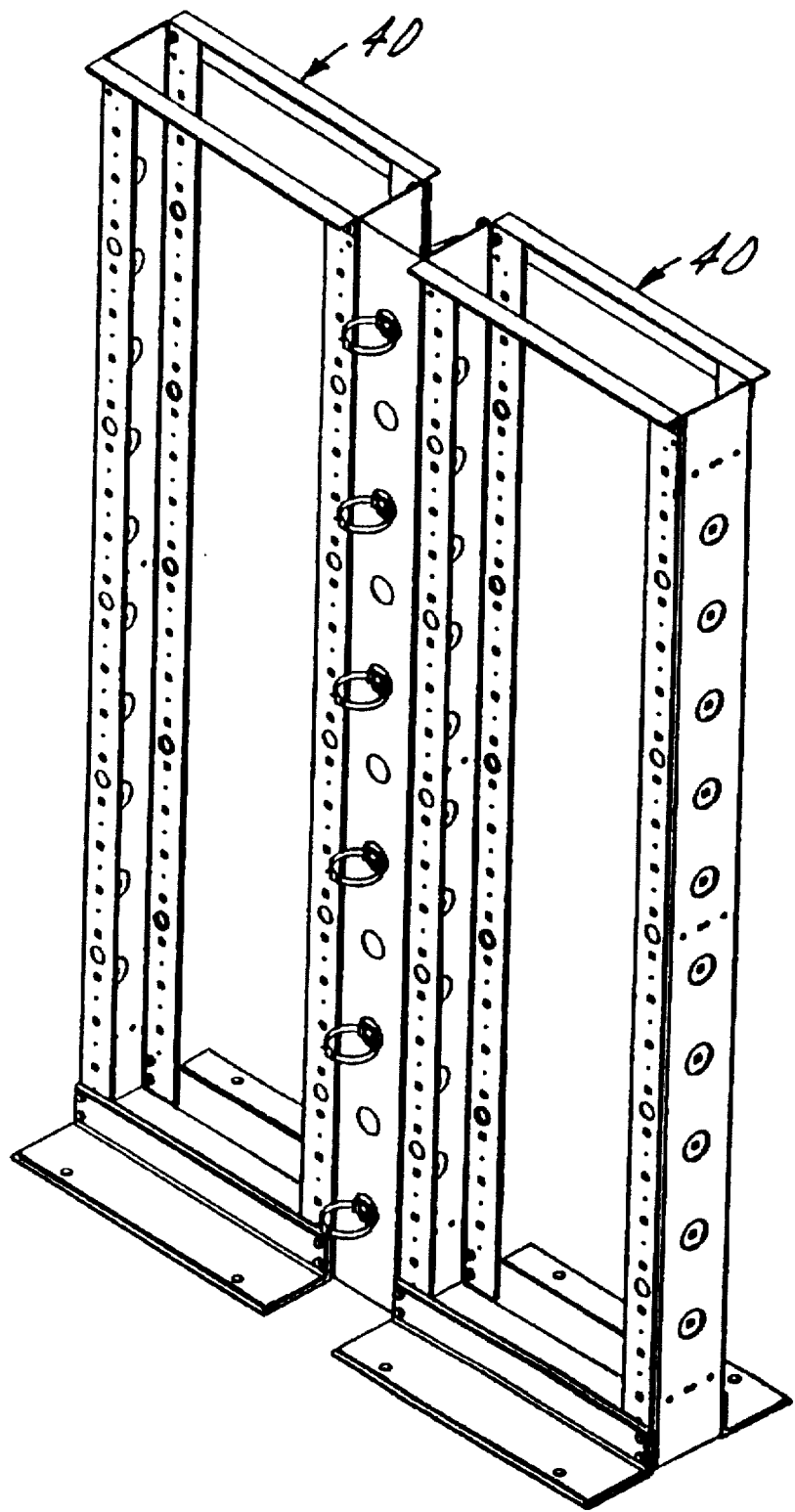
FIG. 14 is a rear perspective view of the cable manager positioned between two racks.
Figure 15:
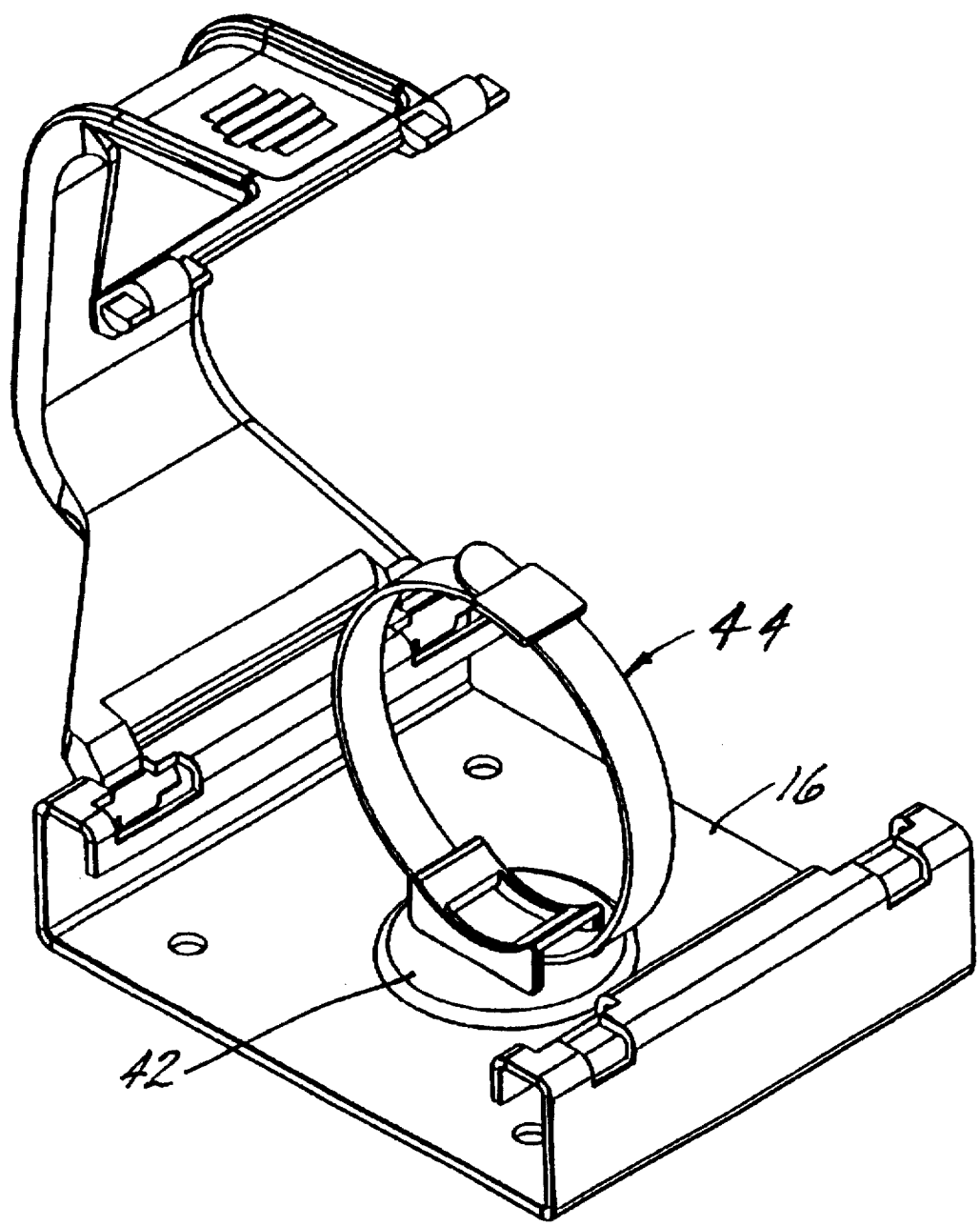
FIG. 15 is a front perspective view of an alternative embodiment of the cable manager.

FIG. 11 is a perspective view of a channel 12 mounted between two racks 40. As described above, the channel retainers 14 can be positioned to accommodate equipment mounted in the racks 40. FIG. 12 is a top view of the cable manager positioned between the two racks 40. The channel 12 includes raised regions 42 having an opening 46 (shown in FIG. 13). The opening 46 receives a cable management device 44. The raised portion 42 allows a cable management device 44 to be placed within the channel (as shown in FIG. 15) and still allow the back walls of two channels to be placed flush against each other. Alternatively, the channel 12 may have an H-shaped cross section, providing a front and rear channel in the same assembly. FIG. 14 is a perspective view of the channel 12 mounted between two racks 40.

FIG. 15 is a perspective view of a portion of a cable manager illustrating the placement of a wire management device 44 mounted in the interior of the cable manager. Installing cable management devices in the inside of the channel provides for separating different types of cable (fiber, copper, etc.) within each cable management device. The raised portion 42 formed in the back wall 16 of the channel prevents a quarter-turn fastener on the bottom of the wire management device 44 from extending beyond the plane of the back wall 16. The allows the back walls of separate channels to be placed flush against each other.

The present invention provides a cable manager that allows the user to define the number and the location of the channel retainers used. The channel retainers can pivot in two directions thereby enhancing the ability to access the cable. Raised portions in the channel provided for the mounting of cable management devices without impeding the ability to mount the cable managers in a back-to-back configuration. The present invention offers the installer a complete system for cable management, thereby making a clean and organized installation, which will make cables easier to access, resulting in more efficient installation and servicing.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A cable manager comprising:
   a channel having a plurality of slots formed therein; and
   a channel retainer mounted in at least two of said slots
   wherein said channel retainer has a first hinge member at a first end of said channel retainer and a second hinge member at a second end of said channel retainer, said first hinge member engaging a first slot and said second hinge member engaging a second slot.

2. The cable manager of claim 1 wherein said channel comprises a first side wall and a second side wall connected to a back wall, each of said side walls having a bent portion.

3. The cable manager of claim 2 wherein said slots are formed in said bent portion.

4. The cable manager of claim 1 wherein said channel retainer is pivotally mounted to said channel when said first hinge member is positioned in said first slot and said second hinge member is disengaged from said second slot.

5. The cable manager of claim 4 wherein said channel retainer is pivotally mounted to said channel when said second hinge member is positioned in said second slot and said first hinge member is disengaged from said first slot.

6. The cable manager of claim 1 wherein said channel retainer is pivotally mounted to said channel when said second hinge member is positioned in said second slot and said first hinge member is disengaged from said first slot.

7. The cable manager of claim 1 wherein said channel is U-shaped.

8. The cable manager of claim 1 wherein said channel is H-shaped.

9. The cable manager of claim 1 wherein said first hinge member comprises an extension and a post substantially perpendicular to said extension.

10. The cable manager of claim 9 wherein said extension includes an arcuate surface.

11. The cable manager of claim 9 wherein said slot includes a slot opening and a slot neck, said slot opening being larger than said post and said slot neck receiving a portion of said extension.

12. A cable manager comprising:

a channel having a first side wall and a second side wall connected to a back wall, each of said side walls having a bent portion, a plurality slots are formed in said bent portion of said first side wall and said second side wall; and a channel retainer having a first hinge member at a first end of said channel retainer and a second hinge member at a second end of said channel retainer, said first hinge member engaging a first slot and said second hinge member engaging a second slot;

wherein said channel retainer is pivotally mounted to said channel when said second hinge member is positioned in said second slot and said first hinge member is disengaged from said first slot.

\* \* \* \* \*